US011281981B2

United States Patent
Sharon et al.

(10) Patent No.: US 11,281,981 B2
(45) Date of Patent: Mar. 22, 2022

(54) STORAGE SYSTEM AND SORTING-BASED METHOD FOR RANDOM READ COMMAND PREDICTION IN A MULTI-QUEUE SYSTEM

(71) Applicant: Western Digital Technologies, Inc., San Jose, CA (US)

(72) Inventors: Eran Sharon, Rishon Lezion (IL); Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 285 days.

(21) Appl. No.: 16/708,107

(22) Filed: Dec. 9, 2019

(65) Prior Publication Data

US 2021/0174224 A1   Jun. 10, 2021

(51) Int. Cl.
*G06F 3/06* (2006.01)
*G06N 5/04* (2006.01)

(52) U.S. Cl.
CPC ............. *G06N 5/04* (2013.01); *G06F 3/0611* (2013.01); *G06F 3/0613* (2013.01); *G06F 3/0659* (2013.01); *G06F 3/0679* (2013.01)

(58) Field of Classification Search
CPC .... G06F 3/0679; G06F 3/0659; G06F 3/0613; G06F 3/0611; G06N 5/04
See application file for complete search history.

(56) References Cited

U.S. PATENT DOCUMENTS

| 5,146,578 | A  | 9/1992  | Zangenehpour |
| 6,092,149 | A  | 7/2000  | Hicken et al. |
| 6,529,998 | B1 | 3/2003  | Yochai et al. |
| 6,721,870 | B1 | 4/2004  | Yochai et al. |
| 7,386,675 | B2 | 6/2008  | Fachan |
| 7,613,883 | B2 | 11/2009 | Bellows et al. |
| 8,225,047 | B2 | 7/2012  | Yano et al. |
| 2003/0149837 | A1 | 8/2003 | Coker et al. |
| 2008/0229071 | A1 | 9/2008 | Shioya et al. |

OTHER PUBLICATIONS

U.S. Appl. No. 16/024,607 entitled "System and Method for Predictive Read of Random Data" filed Jun. 29, 2018.
U.S. Appl. No. 16/024,617 entitled "System and Method for Prediction of Read Commands to Non-sequential Data" filed Jun. 29, 2018.
U.S. Appl. No. 16/226,021 entitled "System and Method for Prediction of Multiple Read Commands Directed to Non-sequential Data" filed Dec. 19, 2018.
U.S. Appl. No. 16/416,911 entitled "System and Method for Performing Discriminative Predictive Read" filed May 20, 2019.

*Primary Examiner* — Charles Rones
*Assistant Examiner* — Han V Doan
(74) *Attorney, Agent, or Firm* — Crowell & Moring LLP

(57) ABSTRACT

A storage system and sorting-based method for random read command prediction in a multi-queue system are provided. In one embodiment, a method for command prediction is performed in a storage system comprising a memory and being in communication with a host. The method comprises receiving a read command sequence from the host, wherein read commands in the read command sequence originate from a plurality of command queues in the host such that read commands in the read command sequence received from the host are out of order; sorting read commands in the read command sequence received from the host based on logical block addresses; and predicting a next read command from the sorted read commands. Other embodiments are provided.

20 Claims, 10 Drawing Sheets

STORAGE SYSTEM AND SORTING-BASED METHOD FOR RANDOM READ COMMAND PREDICTION IN A MULTI-QUEUE SYSTEM

BACKGROUND

Some storage systems identify logical block address (LBA) patterns in random-read scenarios to predict a next read command. By predicting a next read command, the storage system can pre-fetch the data for the predicted next read command before that next read command is actually issued by the host. This can improve the number of input-output operations per second (IOPs) performed by the storage system, as well as improve throughput performance.

DETAILED DESCRIPTION

Overview

Figure 1A:
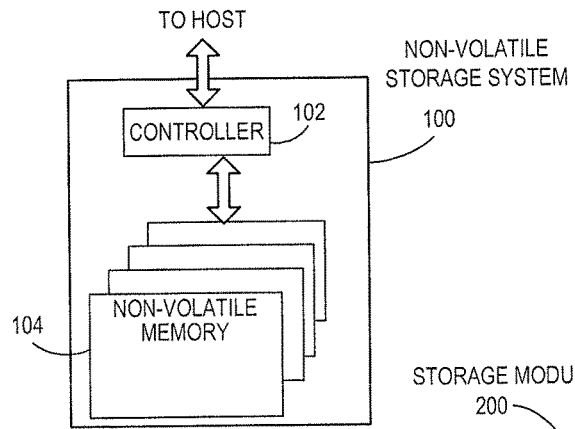
FIG. 1A is a block diagram of a non-volatile storage system of an embodiment.

By way of introduction, the below embodiments relate to a storage system and sorting-based method for random read command prediction in a multi-queue system. In one embodiment, a method for command prediction is performed in a storage system comprising a memory and being in communication with a host. The method comprises receiving a read command sequence from the host, wherein read commands in the read command sequence originate from a plurality of command queues in the host such that read commands in the read command sequence received from the host are out of order; sorting read commands in the read command sequence received from the host based on logical block addresses; and predicting a next read command from the sorted read commands.

In some embodiments, the read command sequence originates from a single thread in the host.

In some embodiments, the single thread comprises one of the following: a submission/completion queue pair, a namespace identifier, a host port, a virtual function, and a stream identifier.

In some embodiments, the commands in the read command sequence are sorted by directing different permutations of logical block addresses to a same sort pattern.

In some embodiments, the memory comprises a three-dimensional memory.

In some embodiments, the storage system is configured to be integrated in the host.

In some embodiments, the storage system is configured to be removably connected with the host.

In another embodiment, a storage system is provided comprising a memory; and a controller. The controller is configured to: receive a plurality of read commands from a host, wherein the plurality of read commands are received from a plurality of command queues in the host; update a log of logical block addresses based on the logical block addresses in the plurality of read commands; and predict a next read command using on the log.

In some embodiments, the controller is configured to predict the next read command by selecting a most-frequently-occurring logical block address from the log.

In some embodiments, the controller is configured to update the log by adapting a used pattern length of the same sort pattern.

In some embodiments, the controller is configured to update the log by a current command at each address in the log.

In some embodiments, the plurality of read commands originate from multiple threads in the host.

In some embodiments, the multiple threads comprise two or more of the following: a submission/completion queue pair, a namespace identifier, a host port, a virtual function, and a stream identifier.

In some embodiments, the memory comprises a three-dimensional memory.

In some embodiments, the storage system is configured to be integrated in the host.

In some embodiments, the storage system is configured to be removably connected with the host.

In another embodiment, a storage system is provided comprising a memory; means for receiving a read command sequence from the host, wherein read commands in the read command sequence originate from a plurality of command queues in the host such that the read commands in the read command sequence received from the host is out of order; and means for processing the read command sequence to predict a next read command.

In some embodiments, the read command sequence originates from a single thread in the host.

In some embodiments, the read command sequence originates from multiple threads in the host.

In some embodiments, the memory comprises a three-dimensional memory.

Other embodiments are possible, and each of the embodiments can be used alone or together in combination. Accordingly, various embodiments will now be described with reference to the attached drawings.

Embodiments

Figure 1B:
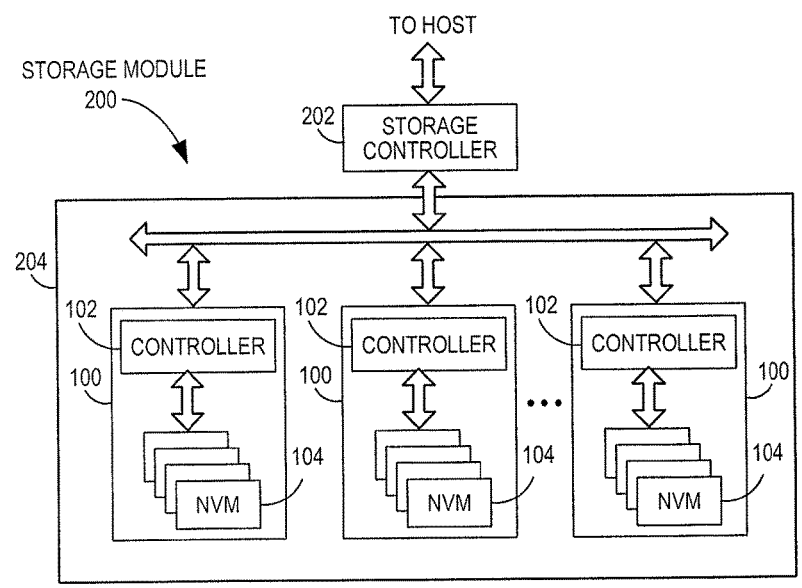
FIG. 1B is a block diagram illustrating a storage module of an embodiment.
Figure 1C:
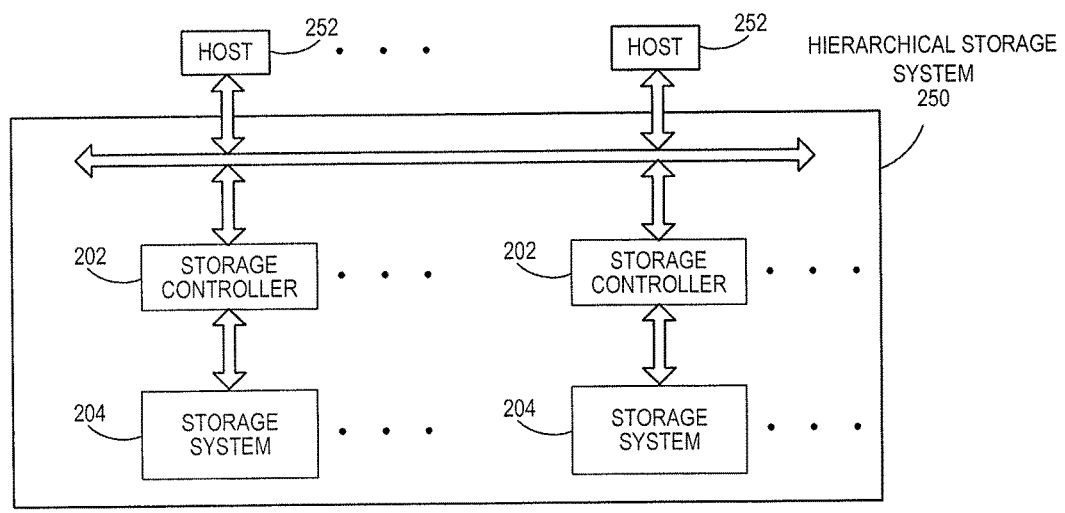
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
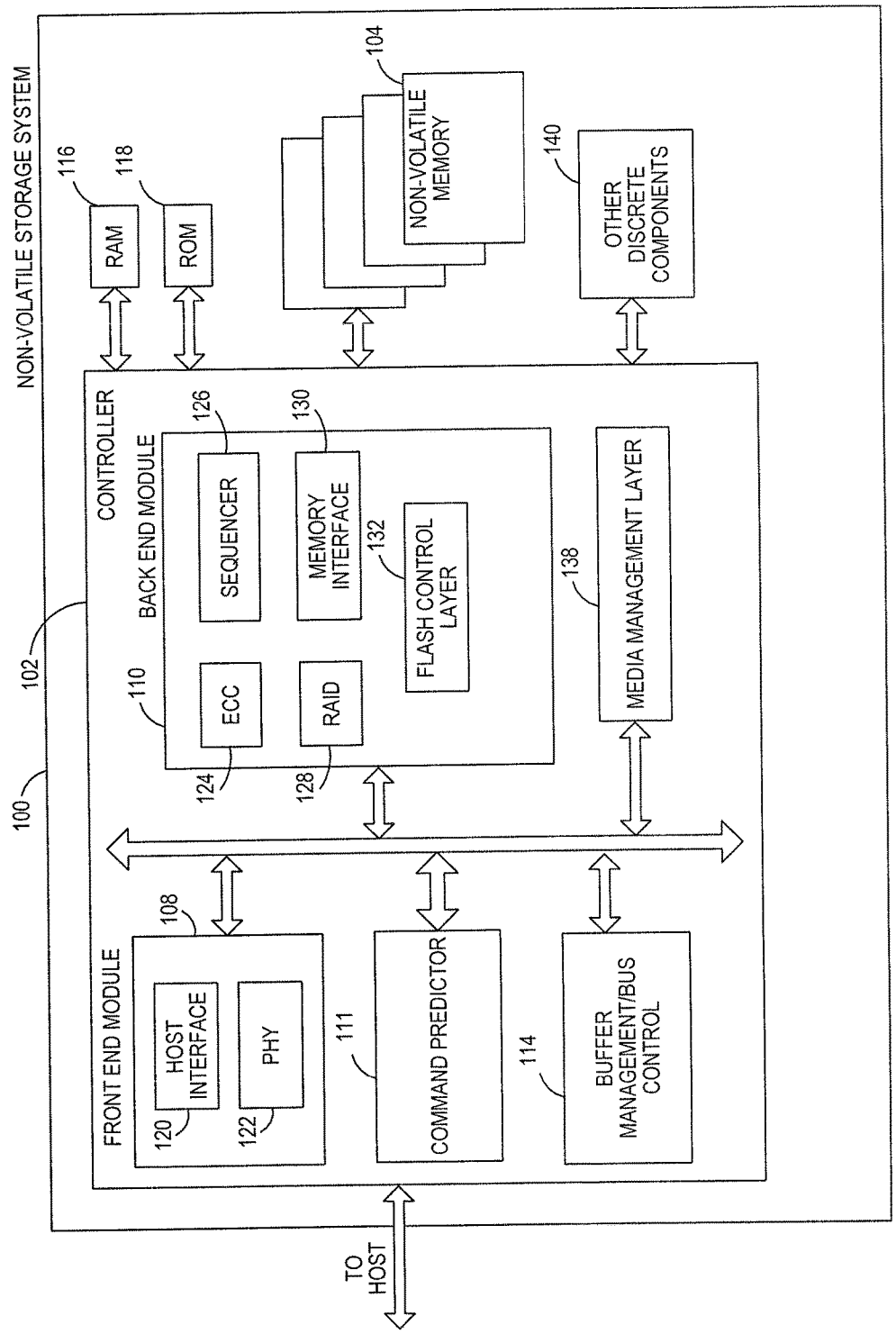
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a command predictor 111, which is discussed in more detail below, and can be implemented in hardware or software/firmware. The command predictor 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
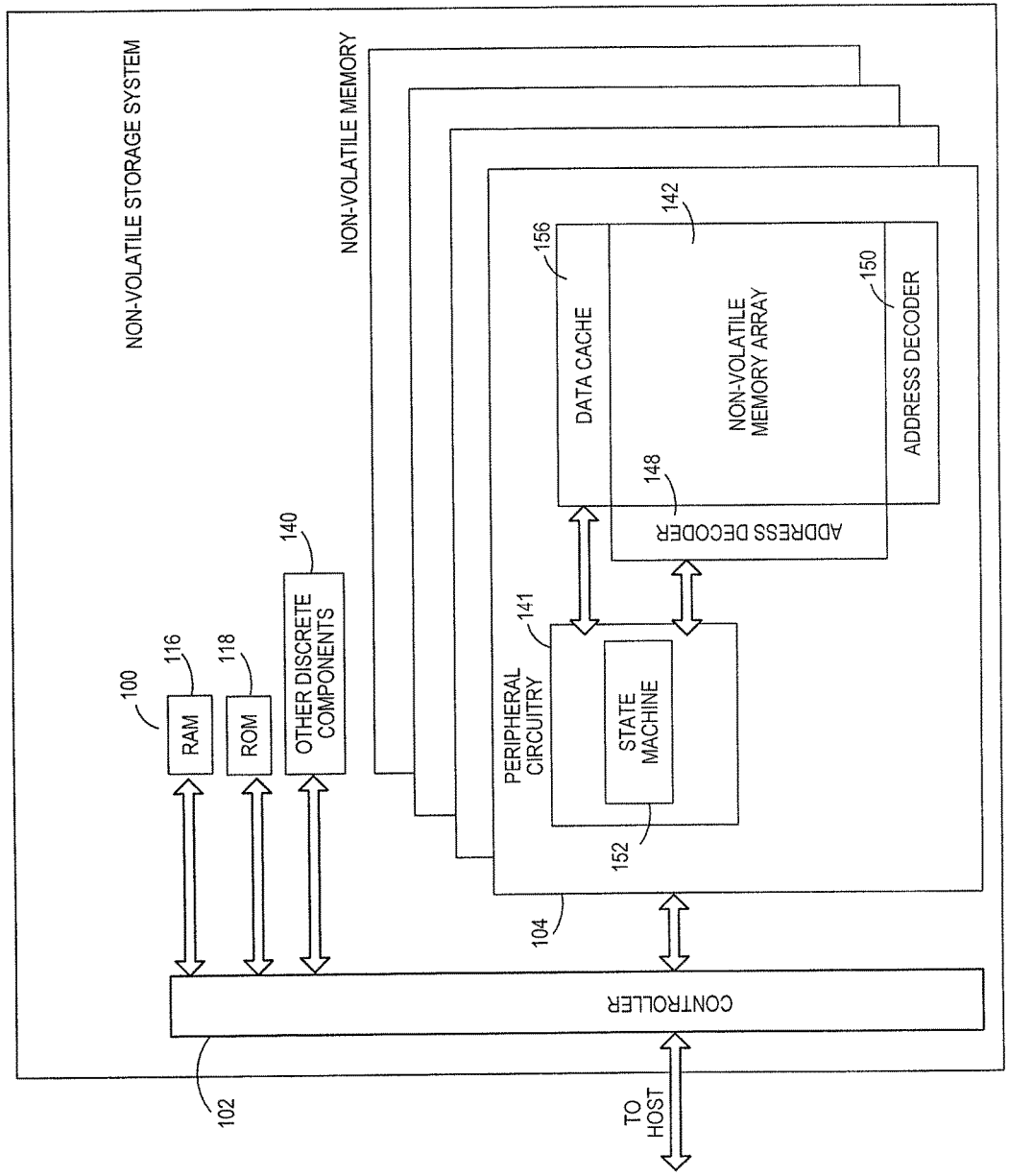
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Some storage systems contain a history-pattern-matcher (HPM) module (e.g., implemented by the storage system's controller executing computer-readable program code) for identifying logical block address (LBA) patterns in random-read scenarios to predict a next read command. Such a mechanism can be used to pre-fetch the data for the predicted next read command before that next read command is actually issued by the host. This can improve the number of input-output operations per second (IOPs) performed by the storage system, as well as improve throughput performance, both in benchmarks and in real-user applications. Further information about read-look-ahead/predictive reads can be found in U.S. patent application Ser. Nos. 16/226,021; 16/024,607; 16/416,911; and Ser. No. 16/024,617, each of which is hereby incorporated by reference. The HPM module involves two processes: (1) the update process, which occurs every time a new read command is received from the host, for maintaining the history patterns log; and (2) the predict process, which usually occurs when there is idle time to allow the controller 102 to initiate a pre-fetch operation and perform a read based on a predicted next logical block address (LBA), which will hopefully be requested next by the host.

Figure 3:
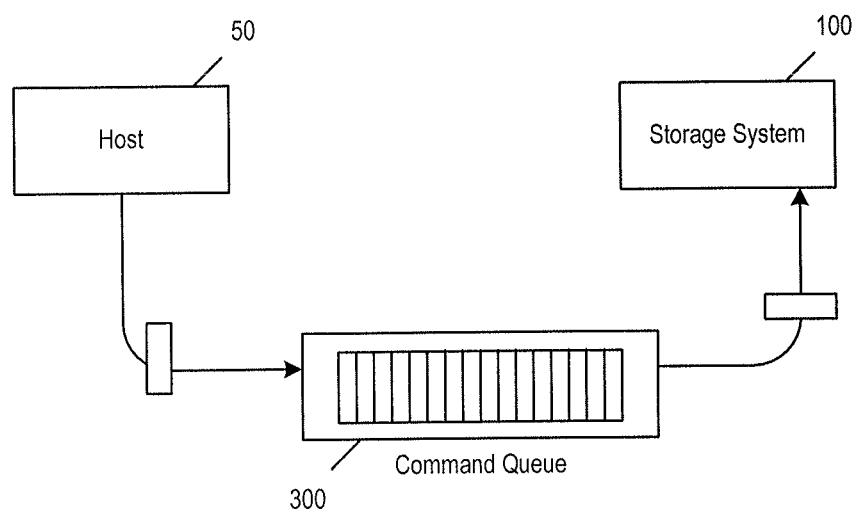
FIG. 3 is a block diagram of a system of an embodiment with a single command queue.
Figure 4:
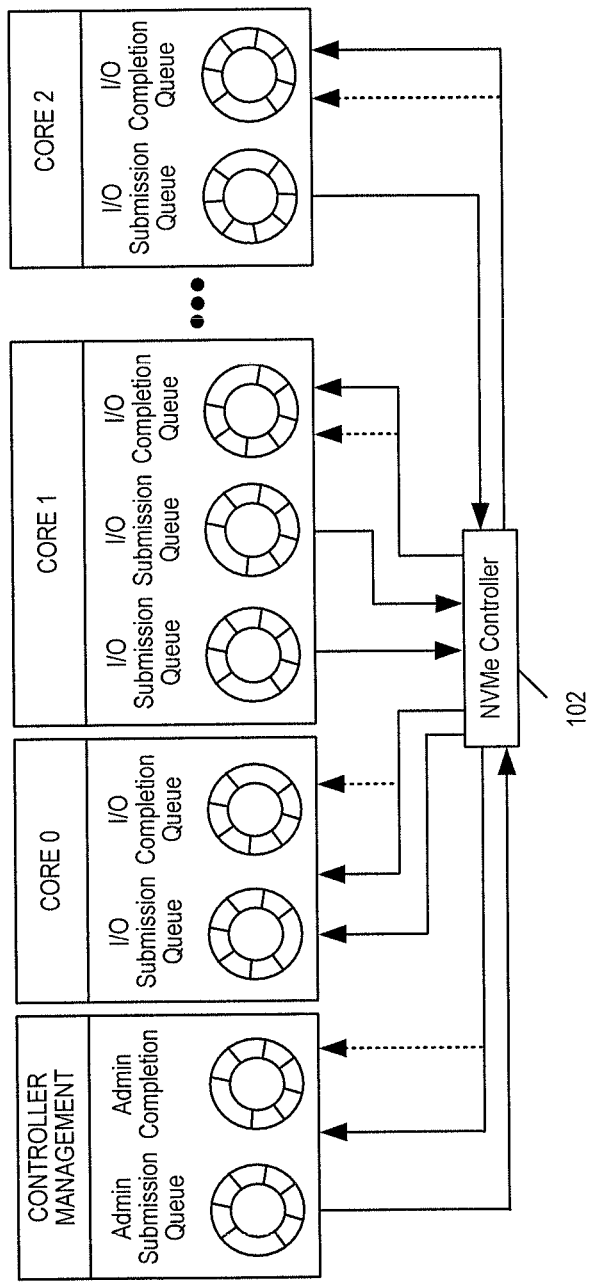
FIG. 4 is a block diagram of a system of an embodiment with multiple command queues.

Some HPM modules assume a single-thread operation, where the command sequence the controller receives is originated in a single thread of the host. This assumption is valid for host-device interfaces using SATA, USB, and SD protocols, for example. However, this assumption is not valid for applications where the command stream originates in a multi-thread operation, such as applications operating under the NVMe protocol. In such situations, the commands that the HPM module gets will usually be shuffled, such that repeating patterns of consecutive read commands will be observed each time in a different order. FIGS. 3 and 4 illustrate this problem. As shown in these drawings, in legacy protocols (FIG. 3), a single command queue 300 is defined, whereas in advanced protocols (FIG. 4) various independent command queues are defined. In this example, each command queue may have its own repeated patterns. This can happen, for example, when commands from a single application are shuffled among the different queues or when commands from multiple applications are interleaved with each other in the same or different queues.

Given the differences between single and multi-thread operations, a HPM module designed for a single-thread environment that predicts future random read commands based on repeating patterns of command sequences will likely fail when used in a multi-thread environment. To address this, a storage system 100 can be designed that duplicates the HPM database per thread. However, the main drawback of this approach is the extra area and power required for handling multiple HPM databases.

The following embodiments present a new concept for allowing prediction of future random read commands—even in a multi-thread system operation mode. These embodiments broaden the definition of single and multi-threads in this context. More specifically, these embodiments re-order the "seen commands" patterns to reveal underlying patterns and allow predictions accordingly.

The nature of command stream that originates from a multi-thread operating system is characterized by a pseudo-random shuffling of the commands, such that repeating patterns of injected commands sequences will be observed at the controller level in a different order each time. In this embodiment, the definition of "thread" is expanded so the hit-rate of the HPM algorithm would increase. As used herein, a thread can any one or more of the following: a submission/completion queue pair, a supported namespace identifier, a supported host port, a virtual function in a single-root input-output virtualization (SR-IOV) interface, and an NVMe stream identifier.

Any suitable mechanism can be used to re-order an observed read command sequence to allow generalization to different permutations of the command sequence. For example, in one embodiment, the controller 102 of the storage system 100 uses a method that is based on sorting the command sequence (referred to herein as "R" or "Pattern-Win") and is illustrated in FIGS. 5-8, which are discussed below. In one embodiment, the update process occurs every time a new read command is received from the host, and the predict process occurs when there is idle time and the controller 102 can initiate a pre-fetch operation and perform a read based on a predicted next logical block address (LBA).

Figure 5:
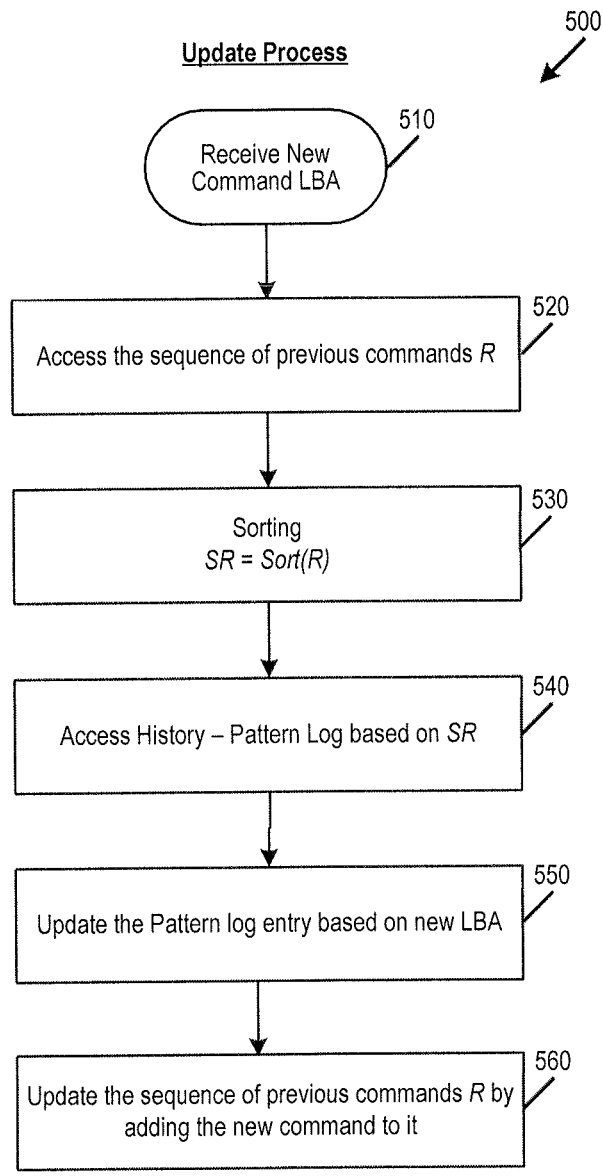
FIG. 5 is a flow chart of an update process of an embodiment.

As mentioned above, the HPM module involves two processes: (1) the update process, which occurs every time a new read command is received from the host, for maintaining the history patterns log; and (2) the predict process, which usually occurs when there is idle time to allow the controller 102 to initiate a pre-fetch operation and perform a read based on a predicted next logical block address (LBA), which will hopefully be requested next by the host. FIG. 5 presents a flow chart 500 of an update process of an embodiment.

As shown in FIG. 5, the controller 102 first receives a new command logical block address (LBA) (act 510). The controller 102 then accesses the sequence of previous commands R (act 520). Next, the controller 102 applies a sorting function, SR=Sort(R) (act 530). Then, the controller 102 accesses the history-pattern log based on SR (act 540). Finally, the controller 102 updates a history pattern log based on the new LBA (act 550) and updates the sequence of previous commands R by adding the new command to it (act 560).

Figure 6:
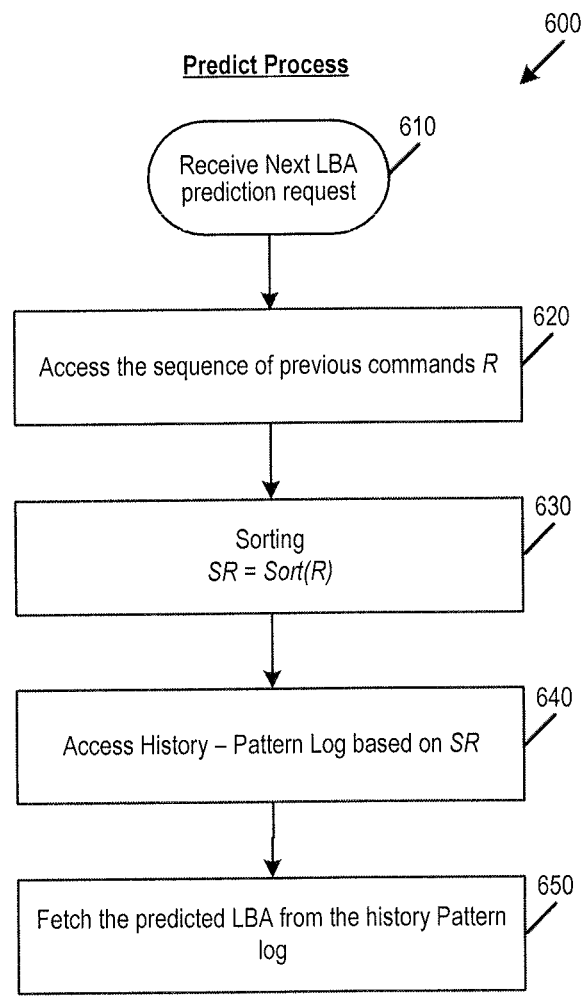
FIG. 6 is a flow chart of a predict process of an embodiment.

FIG. 6 presents a flow chart 600 of a predict process of an embodiment. As shown in FIG. 6, during a prediction operation, for sake of pre-fetching the next command, the controller 102 will perform a similar operation, applying the sorting function SR=Sort(R) on the last sequence R of read LBAs, and then using the sorted sequence SR for accessing the history pattern log (e.g. by computing some hash function on SR) and fetching a prediction of the LBA/s next read command/s. More specifically, as shown in FIG. 6, the controller 102 receives the next LBA prediction request (act 610). Then, the controller 102 accesses the sequence of previous commands R (act 620). The controller 102 then applies the sorting function SR=Sort(R) (act 630) and accesses the history-pattern log based on SR (act 640). Finally, the controller 102 fetches the predicted LBA from the history pattern log (act 650).

In this embodiment, the method overcomes the random shuffling of a given command sequence caused by the multi-thread mechanism operation by directing all different permutations of the same sequence to the same pattern. The drawback of this method is that different command sequences might be mapped to the same sorted pattern, and, therefore, the distinction between similar, though different, patterns is hurt. However, by adapting and optimizing the used pattern length, it is expected that such non-distinguished patterns would be rare. Another consideration here is the effort of the sorting operation.

Figure 7:
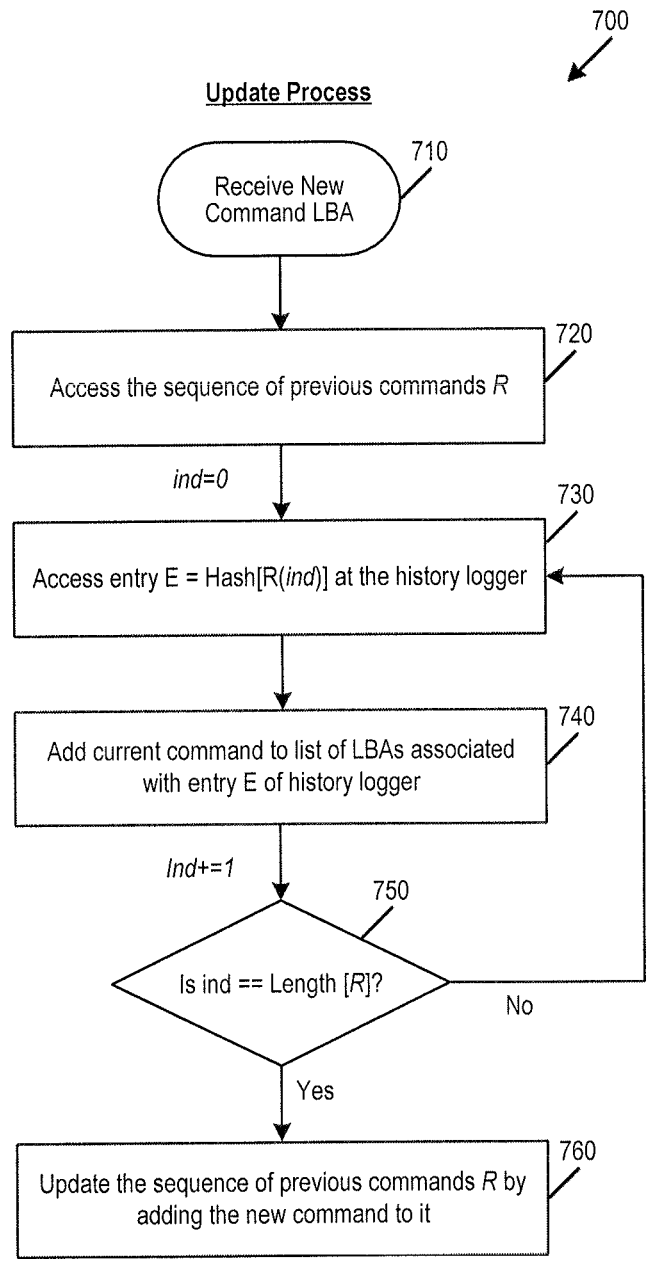
FIG. 7 is a flow chart of an update process of another embodiment.
Figure 8:
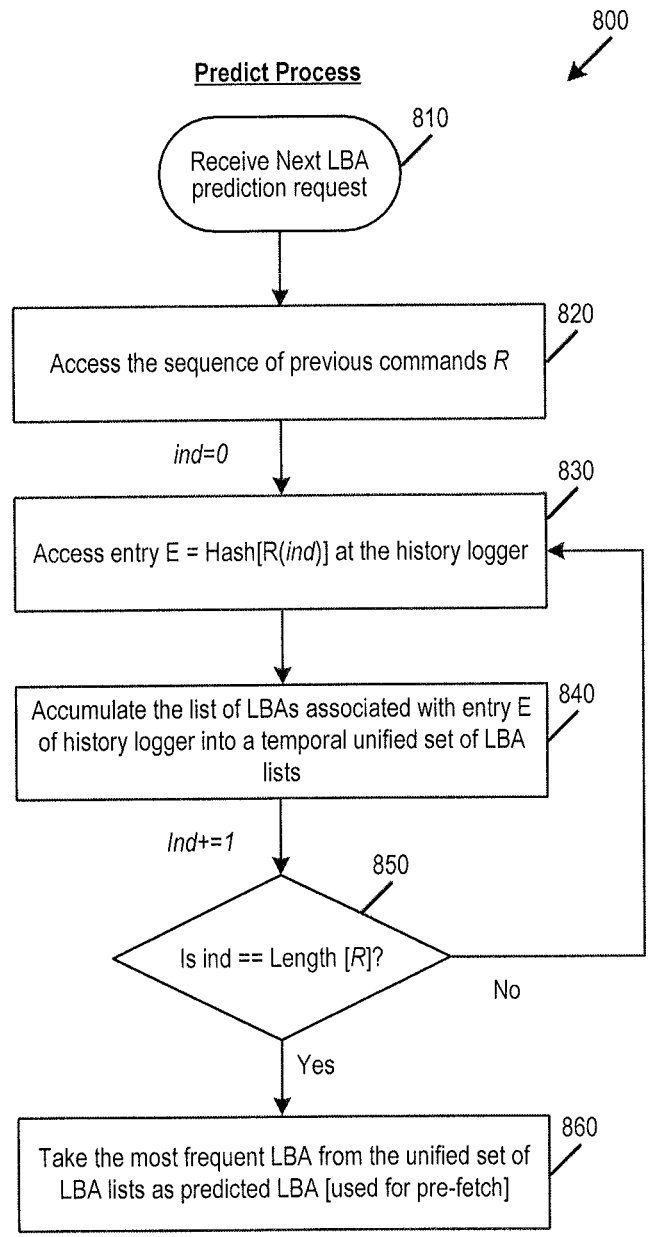
FIG. 8 is a flow chart of a predict process of another embodiment.

As another example, the controller 102 can implement a method to handle shuffled patterns, which is based on maintaining, for each previously-received read command LBA, a list of associated read command LBAs and their frequency, which have previously appeared following that LBA. This method involves updating the current command LBA at each logger address that is pointed out by each command in the command sequence R (e.g., by computing some hash function on R(ind), where ind is the index of the specific command in the sequence R). The updating may involve adding the current LBA to the list of LBAs associated with Hash(R(ind)) in the history logger or incrementing its frequency counter, in case it already appears in the list. This embodiment is illustrated in FIGS. 7 and 8. In general, during a prediction operation, for sake of pre-fetching the next command, the controller 102 may access the history logger to extract the set of lists of associated LBAs to each of the LBAs in the last sequence of commands R (e.g., each list retrieved by accessing the history logger according to Hash(R(ind)), where ind is incremented over the commands in R). Then, the predicted LBA or LBAs may be determined as the most frequent LBA or LBAs in the unified set of LBA lists. This approach can overcome the shuffling of commands within the sequence R.

Turning now to the flow charts, FIG. 7 presents a flow chart 700 for an update process of this embodiment. As shown in FIG. 7, the storage system's controller 102 first receives a new command LBA from the host 50 (act 710). It maintains a sequence of previous command LBAs R. The controller 102 then accesses the sequence of previous commands R (act 720) and accesses entry E=Hash[R(ind)] at the history logger (act 730). The controller 102 then adds the current command to the list of LBAs associated with entry E of the history logger (act 740). Then, the controller 102 determines if ind=Length [R] (act 750). If it is, the controller 102 updates the sequence of previous commands R by adding the new command to it (act 660).

Accordingly, in this process, the controller 102 scans the sequence of previous LBA's R and for each command index ind accesses the history pattern log, e.g., by computing a hash function on the command Hash(R(ind)). Then, the recently-received command LBA is added to the list of LBAs stored in the corresponding history patterns log entry. In case the recently-received command LBA is already in the list, its frequency counter may be incremented.

During a predict process, for sake of pre-fetching the next command, the controller 102 may access the history logger to extract the set of lists of associated LBAs to each of the LBAs in the sequence of last commands R (e.g., each list retrieved by accessing the history logger according to Hash (R(ind)), where ind is incremented over the commands in R). Then, the predicted LBA or LBAs may be determined as the most-frequent LBA or LBAs in the unified set of LBA lists.

FIG. 8 is a flow chart 800 of the predict process of this embodiment. As shown in FIG. 8, the controller 102 receives the new LBA prediction request (act 810). Next, the controller 102 accesses the sequence of previous commands R (act 820) and accesses entry E=Hash[R(ind)] at the history logger (act 830). The controller 102 then accumulates the list of LBAs associated with entry E of the history logger into a temporal unified set of LBA lists (act 840). Then, the controller 102 determines if ind=Length [R] (act 850). If it is, the controller 102 takes the most frequent LBA from the unified set of LBA lists as the predicted LBA, which is used for pre-fetch (act 860).

Figures 9, 10:
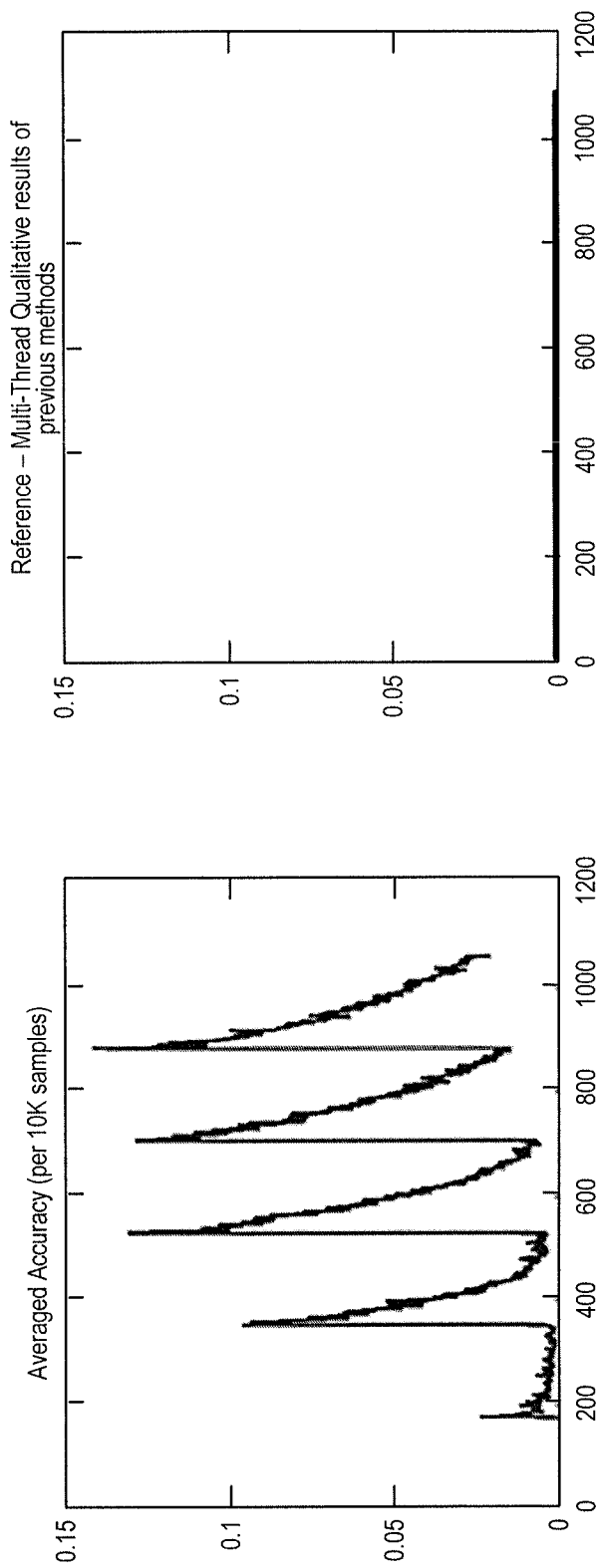
FIG. 9 is a graph of an embodiment showing a qualitative comparison of prediction capabilities in a single queue environment.
FIG. 10 is a graph of an embodiment showing a qualitative comparison of prediction capabilities in a multi-thread environment.

Returning to the drawings, FIGS. 9 and 10 are graphs of qualitative results using a Crystal-Disk-Mark 6 (CDM6) benchmark for the single- and multiple-thread environments, respectively. This benchmark involves a part of a repeating stream of identical synthetic random read commands sequences subject to a multi-thread operating system. Conventional prediction mechanisms are expected to provide zero prediction performance capabilities, whereas a variant of the method illustrated in FIG. 6 indicates prediction capabilities.

Finally, as mentioned above, any suitable type of memory can be used, Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for command prediction, the method comprising:
   performing the following in a storage system comprising a memory and being in communication with a host:
      receiving a read command sequence from the host, wherein read commands in the read command sequence originate from a plurality of command queues in the host such that read commands in the read command sequence received from the host are out of order;
      sorting read commands in the read command sequence received from the host based on logical block addresses; and
      predicting a next read command from the sorted read commands.

2. The method of claim 1, wherein the read command sequence originates from a single thread in the host.

3. The method of claim 2, wherein the single thread comprises one of the following: a submission/completion queue pair, a namespace identifier, a host port, a virtual function, and a stream identifier.

4. The method of claim 1, wherein the read commands in the read command sequence are sorted by directing different permutations of logical block addresses to a same sort pattern.

5. The method of claim 1, wherein the memory comprises a three-dimensional memory.

6. The method of claim 1, wherein the storage system is configured to be integrated in the host.

7. The method of claim 1, wherein the storage system is configured to be removably connected with the host.

8. A storage system comprising:
   a memory; and
   a controller configured to be in communication with the memory, wherein the controller is further configured to:
      maintain, for each previously-received read command logical block address, a list of associated read command logical block addresses and frequency of use of each of the associated read command logical block addresses;
      update a current-command logical block address at each logger address in a history logger that is associated with each command in a command sequence; and
      predict a next command by accessing the history logger to extract a set of lists of associated logical block addresses to each logical block address in the command sequence.

9. The storage system of claim 8, wherein the updating comprises adding the current-command logical block address to a list of logical block addresses associated with a hash function in the history logger.

10. The storage system of claim 8, wherein the updating comprises incrementing a frequency counter associated with the current-command logical block address.

11. The storage system of claim 8, wherein a predicted logical block address is determined as a most-frequent logical block address in the set of logical block address lists.

12. The storage system of claim 8, wherein the current command sequence originates from multiple threads in a host.

13. The storage system of claim 12, wherein the multiple threads comprise two or more of the following: a submission/completion queue pair, a namespace identifier, a host port, a virtual function, and a stream identifier.

14. The storage system of claim 8, wherein the memory comprises a three-dimensional memory.

15. The storage system of claim 8, wherein the storage system is configured to be integrated in a host.

16. The storage system of claim 8, wherein the storage system is configured to be removably connected with the host.

17. A storage system comprising:
   a memory;
   means for maintaining, for each previously-received read command logical block address, a list of associated read command logical block addresses and frequency of use of each of the associated read command logical block addresses;
   means for updating a current-command logical block address at each logger address in a history logger that is associated with each command in a command sequence; and means for predicting a next command by accessing the history logger to extract a set of lists of associated logical block addresses to each logical block address in the command sequence.

18. The storage system of claim 17, wherein the command sequence originates from a single thread in the host.

19. The storage system of claim 17, wherein the command sequence originates from multiple threads in the host.

20. The storage system of claim 17, wherein the memory comprises a three-dimensional memory.

* * * * *